(12) United States Patent
Rogier

(10) Patent No.: US 7,021,326 B2
(45) Date of Patent: Apr. 4, 2006

(54) COMBINATION INFLATION AND RELIEF VALVE

(75) Inventor: Stephen J. Rogier, Palm Harbor, FL (US)

(73) Assignee: Halkey-Roberts Corporation, St. Petersburg, FL (US)

( * ) Notice: Subject to any disclaimer, the term of this patent is extended or adjusted under 35 U.S.C. 154(b) by 0 days.

(21) Appl. No.: 10/663,441

(22) Filed: Sep. 15, 2003

(65) Prior Publication Data

US 2004/0123900 A1 Jul. 1, 2004

Related U.S. Application Data

(60) Provisional application No. 60/410,411, filed on Sep. 13, 2002.

(51) Int. Cl.
*F16K 15/20* (2006.01)
*F16K 17/196* (2006.01)

(52) U.S. Cl. .................. 137/226; 137/49.33; 137/493.6

(58) Field of Classification Search ................ 137/226, 137/493.3, 493.6, 493.9
See application file for complete search history.

(56) References Cited

U.S. PATENT DOCUMENTS

| 1,110,922 | A | * | 9/1914 | Goodyear | ................ 137/493.6 |
| 1,342,985 | A | * | 6/1920 | Cash | ........................ 137/493.4 |
| 1,934,572 | A | * | 11/1933 | Sutton | ........................ 137/226 |
| 2,254,655 | A | * | 9/1941 | Hollowell | .................... 137/226 |
| 2,517,917 | A | * | 8/1950 | Payne | ........................ 137/226 |
| 2,606,570 | A | * | 8/1952 | Buenik | ........................ 137/226 |
| 2,690,757 | A | * | 10/1954 | Orchowski | .................. 137/226 |
| 3,454,033 | A | * | 7/1969 | Smith | ........................ 137/226 |

\* cited by examiner

*Primary Examiner*—John Rivell
(74) *Attorney, Agent, or Firm*—Holland & Knight LLP

(57) ABSTRACT

A combination inflation and relief valve having an inflation gasket mounted on a reciprocating stem head that separates from a valve seat of a valve body against the force of an inflation spring upon inflation and having a relief gasket mounted on a reciprocating push disk that separates from the stem head against the force of a relief spring to allow excess internal pressure to vent through relief holes.

11 Claims, 20 Drawing Sheets

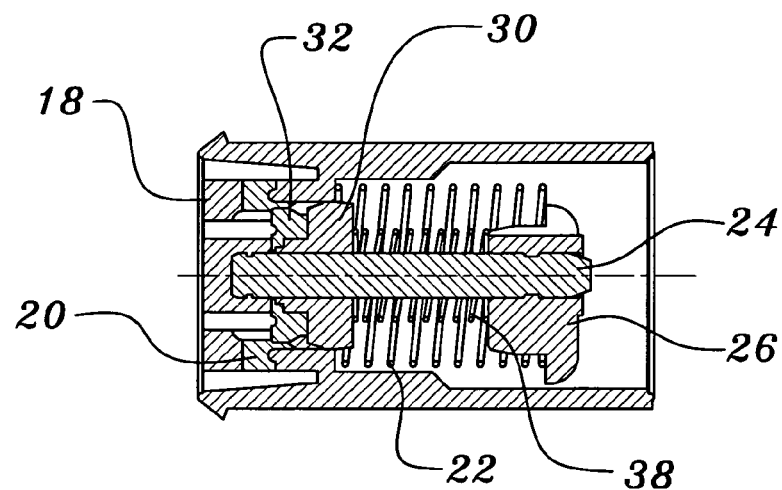
FIG. 3
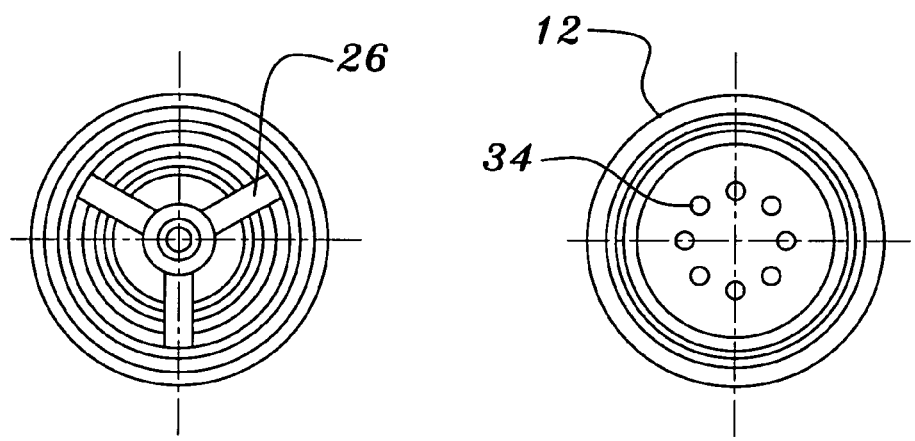
FIG. 4
FIG. 5

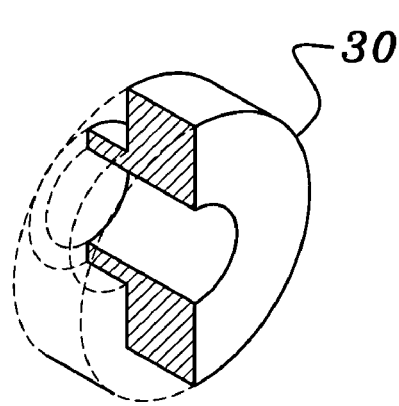 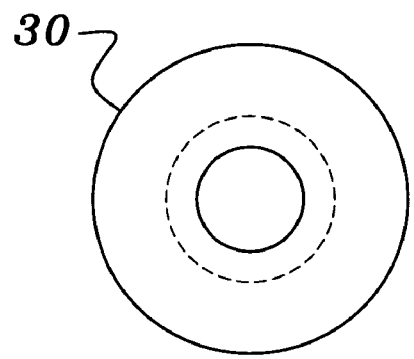
*FIG. 7A*  *FIG. 7B*
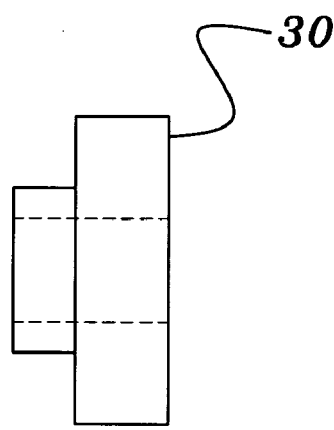 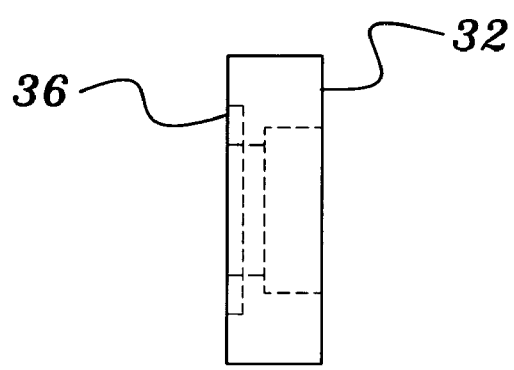
*FIG. 7C*  *FIG. 7D*

COMBINATION INFLATION AND RELIEF VALVE

CROSS-REFERENCE TO RELATED APPLICATIONS

This application claims the benefit of provisional application No. 60/410,411, filed Sep. 13, 2002, the disclosure of which is hereby incorporated by reference herein.

BACKGROUND OF THE INVENTION

1. Field of the Invention

This invention relates to a combination inflation and relief valve.

2. Description of the Background Art

Presently, there exist numerous types of valves for inflating articles such as personal floatation devices (life vests, rings and horseshoes), life rafts, buoys and emergency signaling equipment. There also exist many types of relief valves that allow venting of an inflated article once the internal pressure exceeds a preset cracking pressure.

In the garment industry, it has been proposed to increase the thermal insulation properties of a garment by incorporating a network of air channels within the garment such that, when the air channels are inflated, greater insulative properties are attained. Current inflatable garments of this variety utilize an inflation valve mounted to an inflation tube connected in fluid communication with the air channels. The inflation valve/inflation tube is positioned proximate to the shoulder area of the garment such that the wearer of the garment may easily inflate the garment by mouthing the inflation valve and forcing air through the valve/tube into the channels of the garment. A relief valve is also provided, mounted to a deflation tube connected in fluid communication with the air channels. The relief valve is typically preset with a relatively low cracking pressure such that the garment may be deflated by simply rolling and squeezing it until the desired amount of air, or all of the air, is forced out of the internal air chambers of the garment via the relief valve.

Therefore, it is an object of this invention to provide an improvement which overcomes the aforementioned inadequacies of the prior art devices and provides an improvement which is a significant contribution to the advancement of the inflation and relief valve art.

Another object of this invention is to provide a combination and relief valve to allow inflation and deflation of an article through a single valve, thereby obviating the need for separate inflation valve/tube and relief valve/tube.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises a combination inflation and relief valve.

The two-way valve doubles as both an inflation valve and a relief valve. During inflation, air is allowed to enter through the unbarbed end when it reaches a specified cracking pressure. When this occurs, the inflation gasket of the stem head separates from the valve body causing the inflation spring to compress. Air is now able to flow through the valve body. After the inflation pressure drops below the cracking pressure, the gasket and stem head return to their original position and create a seal between the gasket and valve body.

The relief function of the valve begins when the internal air pressure at the relief end of the valve reaches a specified cracking pressure. This forces the relief gasket and push disk to separate from the stem head and slide on the stem. This, in turn, compresses the relief spring and allows air to flow through the relief vent holes. Once the internal pressure falls below the cracking pressure the relief gasket and push disk return to their original position.

In one embodiment, the relief gasket comprises a cupped design that allows the gasket to seal on both the outside and inside of the circular patterned relief holes. In another embodiment, the relief gasket comprises an O-ring that seals against the annular edges of an annular slot formed in communication with the relief vent holes.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 3 is a longitudinal cross-sectional view of the assembled inflation and relief valve of the invention;

FIG. 4 is a right end view of FIG. 3;

FIG. 5 is a left end view of FIG. 3;

FIGS. 7A, 7B and 7C are views of the push disc component of the valve and FIG. 7D is a cross-sectional view of the relief gasket to be mounted thereon;

Similar reference characters refer to similar parts throughout the several views of the drawings.

DETAILED DESCRIPTION OF THE PREFERRED EMBODIMENT

Figure 1:
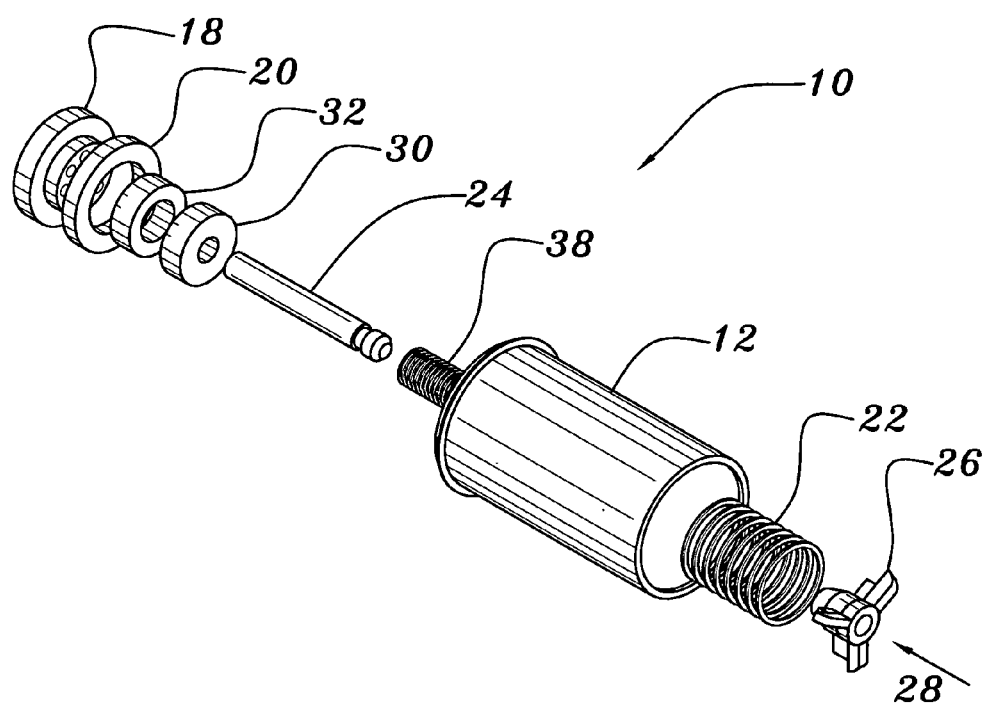
FIG. 1 is an exploded isometric view of the first embodiment of the combination inflation and relief valve of the invention.
Figure 2:
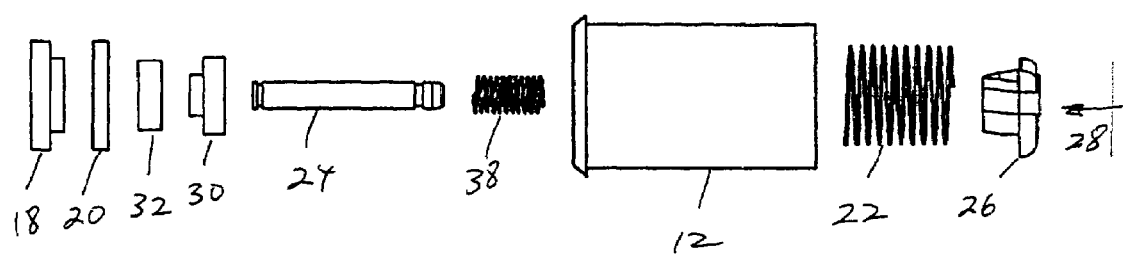
FIG. 2 is an exploded side view of the inflation and relief valve of the invention.
Figure 6A:
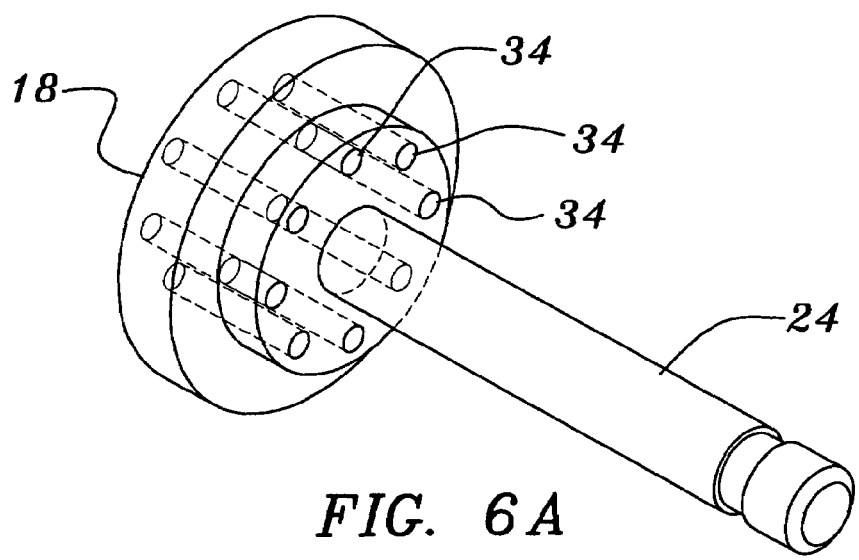
FIGS. 6A, 6B and 6C are views of the stem head and stem components of the valve.
Figure 6B:
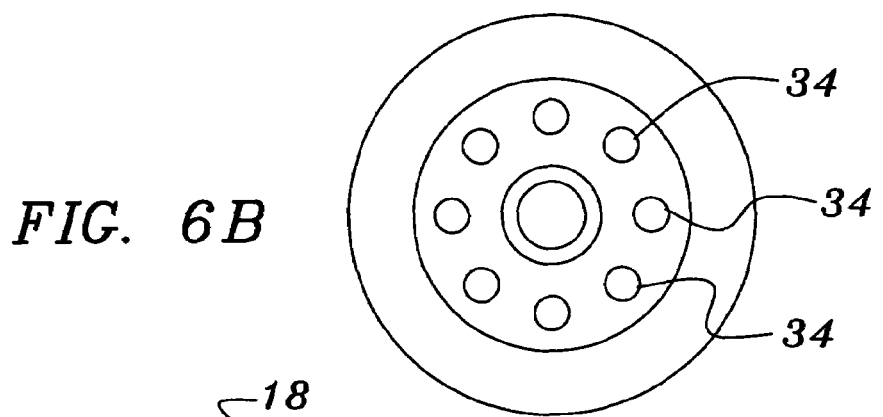
Figure 6C:
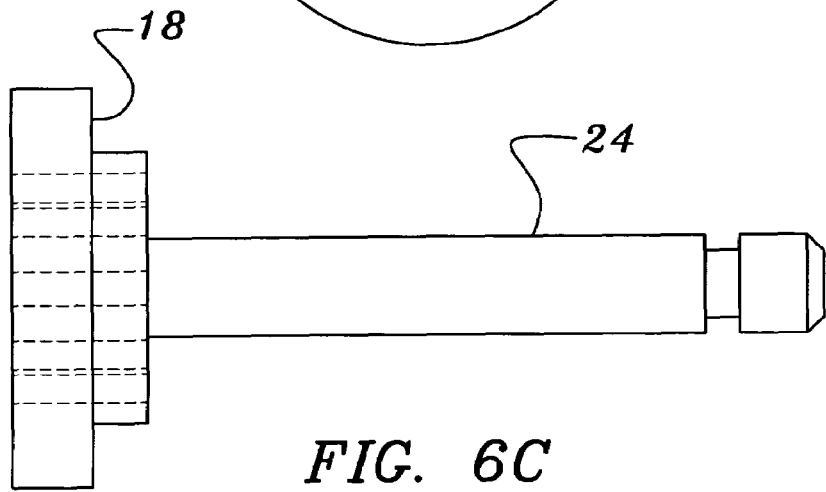
Figure 8A:
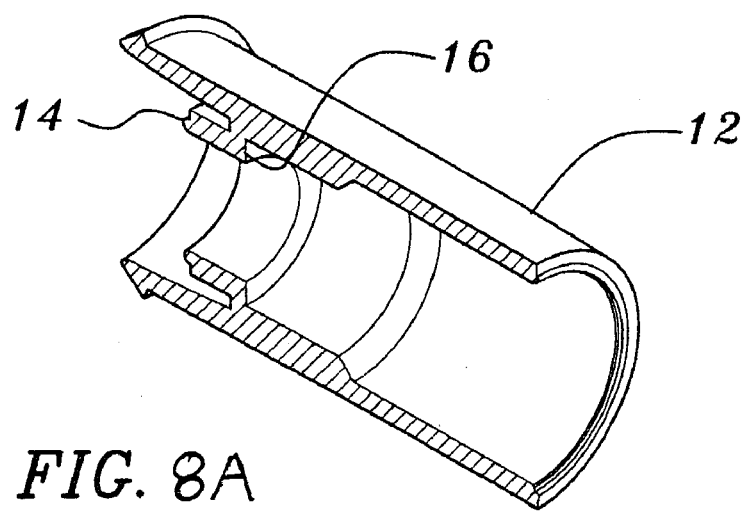
FIGS. 8A, 8B and 8C are views of the body of the valve.
Figure 8B:
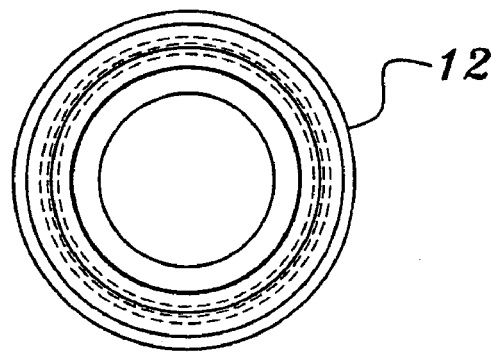
Figure 8C:
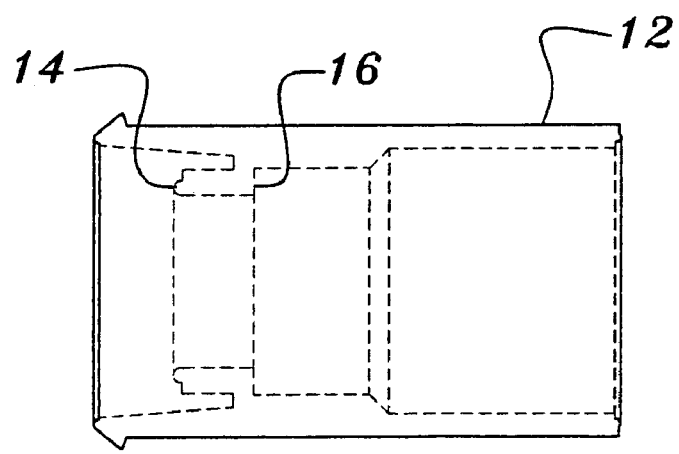

The inflation and relief valve 10 of the invention comprises a generally cylindrical valve body 12 having an internal annular inflation valve seat 14 and an annular inflation spring seat 16 (see FIGS. 8A, 8B and 8C). A stem head 18 (see FIGS. 6A, 6B and 6C), to which is concentrically mounted an inflation gasket 20 (see FIGS. 1 and 2), is reciprocatably mounted within the valve body for resilient sealing engagement with the inflation valve seat 14 by means of an inflation spring 22 concentrically positioned about a stem 24 and entrained between the inflation spring seat 16 and a poppet guide 26 securely affixed to the inflation end of the stem 24. Application of air pressure to the inflation input 28 of the valve 10 cracks the pressure exerted by the inflation spring 22 allowing inflation of the article to which the valve 10 is fluidly connected.

The relief components of the valve 10 comprise a push disk 30 having a central hole for sliding engagement along the length of the stem 24. A relief gasket 32 is mounted to the relief side of the push disk 30 in alignment with a plurality of relief holes 34 formed through the stem head 18 in a concentric pattern. It is noted that the sealing surface of the relief gasket 32 may be cup-formed 36 to provide a more adequate seal about the concentric relief holes 34. A relief spring 38 is positioned concentrically about the stem 24 and entrained between the push disk 30 and the poppet guide 26 so as to constantly urge the relief gasket 32 of the push disk 30 into sealing engagement about the relief holes 34. It is noted that the poppet guide 26 preferably includes a stepped configuration to assure concentric alignment of the larger diameter inflation spring 22 and the smaller diameter relief spring 38. Once the internal air pressure of the article to which the valve 10 is connected exceeds the preset cracking pressure as determined by the relief spring 38 to unseat the relief gasket 32 and cause the push disk 30 to slide along the stem 24, internal air flow from the article is allowed to flow through the relief holes 34 past the relief gasket 32 and out the valve body 12, thereby relieving the air pressure of the inflated article.

Figure 9:
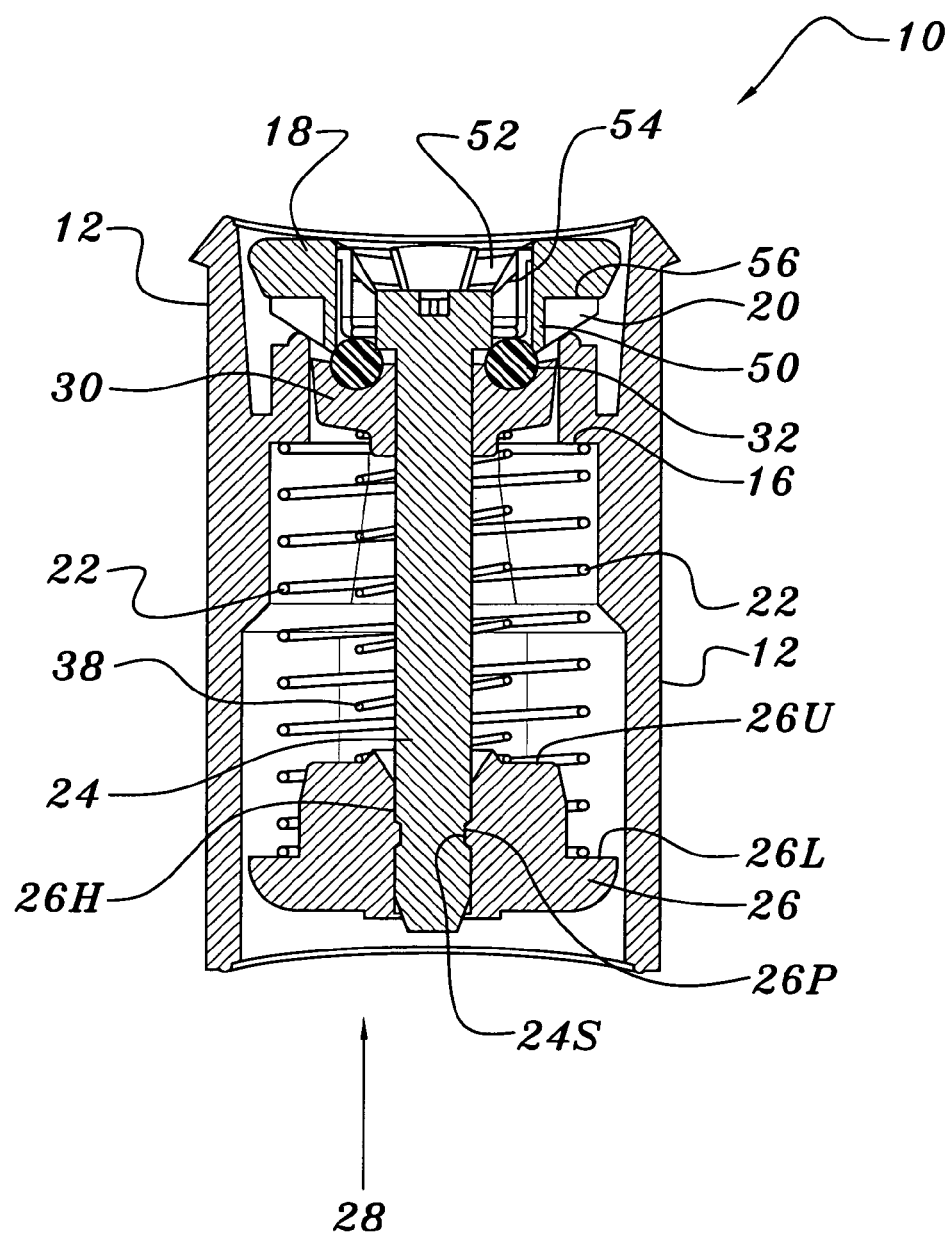
FIG. 9 is a longitudinal cross-sectional view of a second embodiment of the combination inflation and relief valve of the invention.

As shown in FIG. 9, the second embodiment of the combination inflation and relief valve 10 of the invention similarly includes an inflation body 12 in which is positioned a reciprocating stem head 18 integrally formed with a reciprocating stem 24 and having a poppet 26 coupled to the inflation end thereof.

Figure 10:
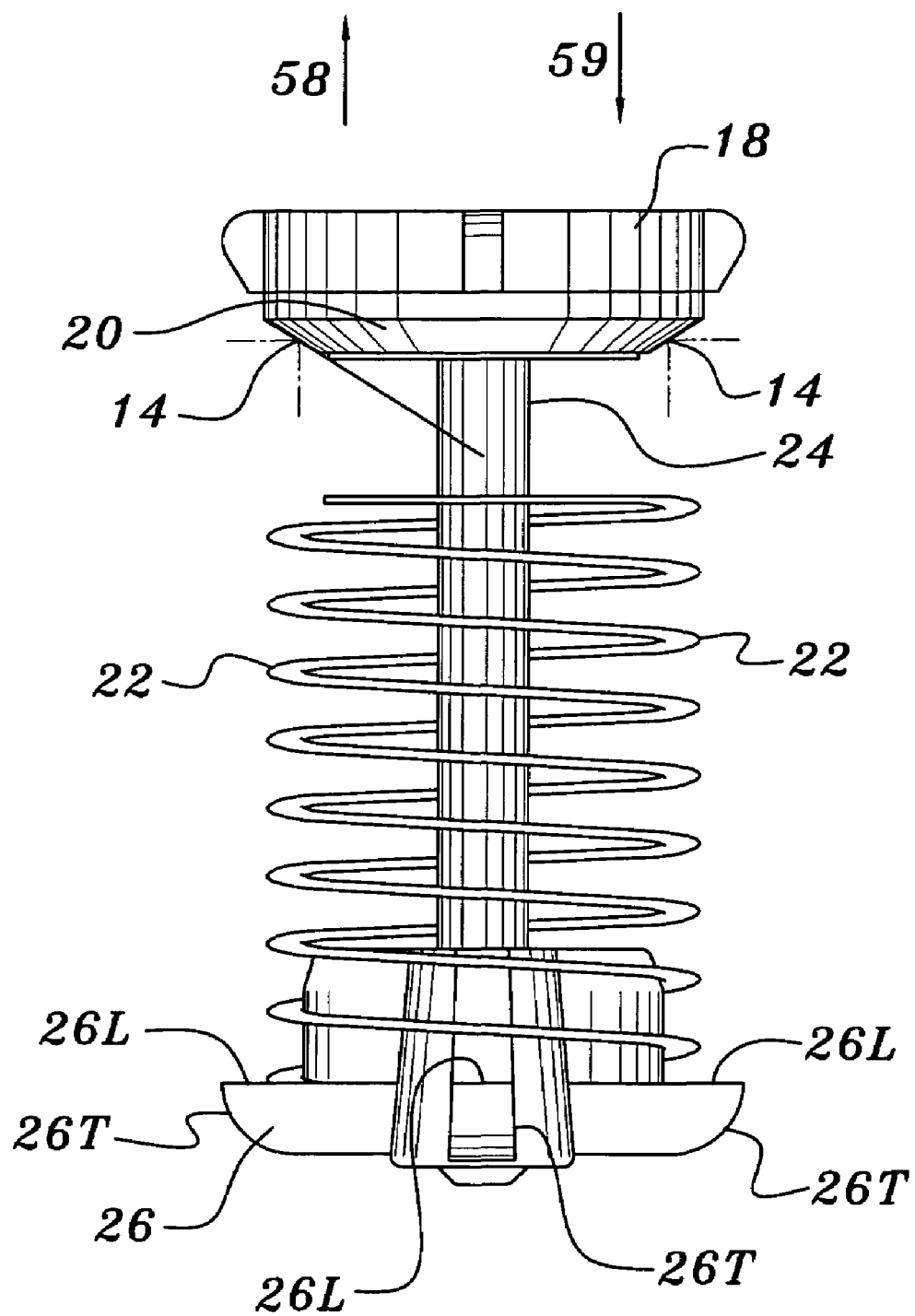
FIG. 10 is a side elevational view of the inflation components of the second embodiment of the valve of the invention with the valve body removed for clarity.

As best shown in FIGS. 11A–E, stem head 18 includes an annular slot 50 connected in fluid communication with a plurality of radial slots 52 extending through the length of the stem head 18 to form vent openings 54. The stem head 18 further includes an annular external slot 56 for receiving the inflation gasket 20. As best shown in FIGS. 9 and 10, the outer surface of the inflation gasket 20 is annularly disposed to form a seal with the annular seat 14 formed within the valve body 12 upon being urged by the inflation spring 22 entrained between the annular step 16 of the valve body 12 and the lower annular step 26L formed in the poppet 26.

Figure 11A:
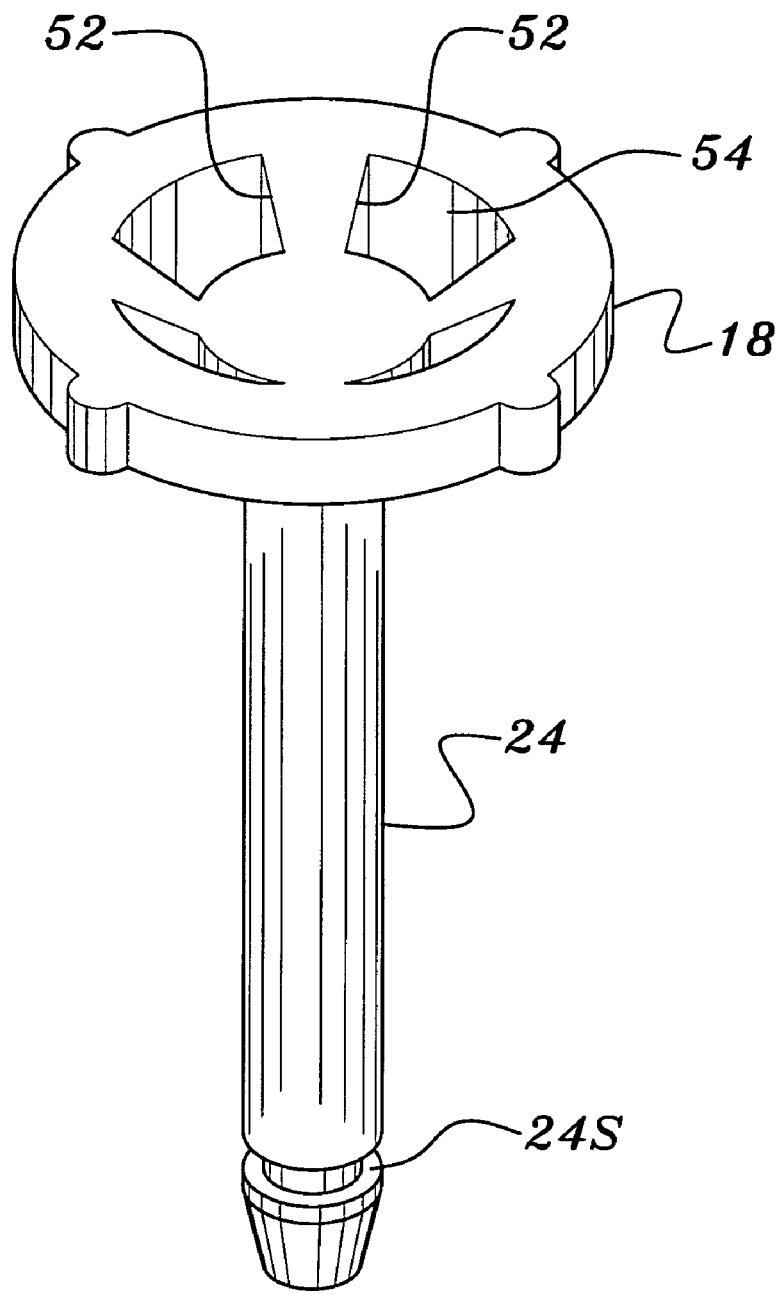
FIGS. 11A–11E are perspective, side elevational, cross-sectional, top elevational and bottom elevational views, respectively, of the stem head and stem of the second embodiment of the invention.
Figure 11B:
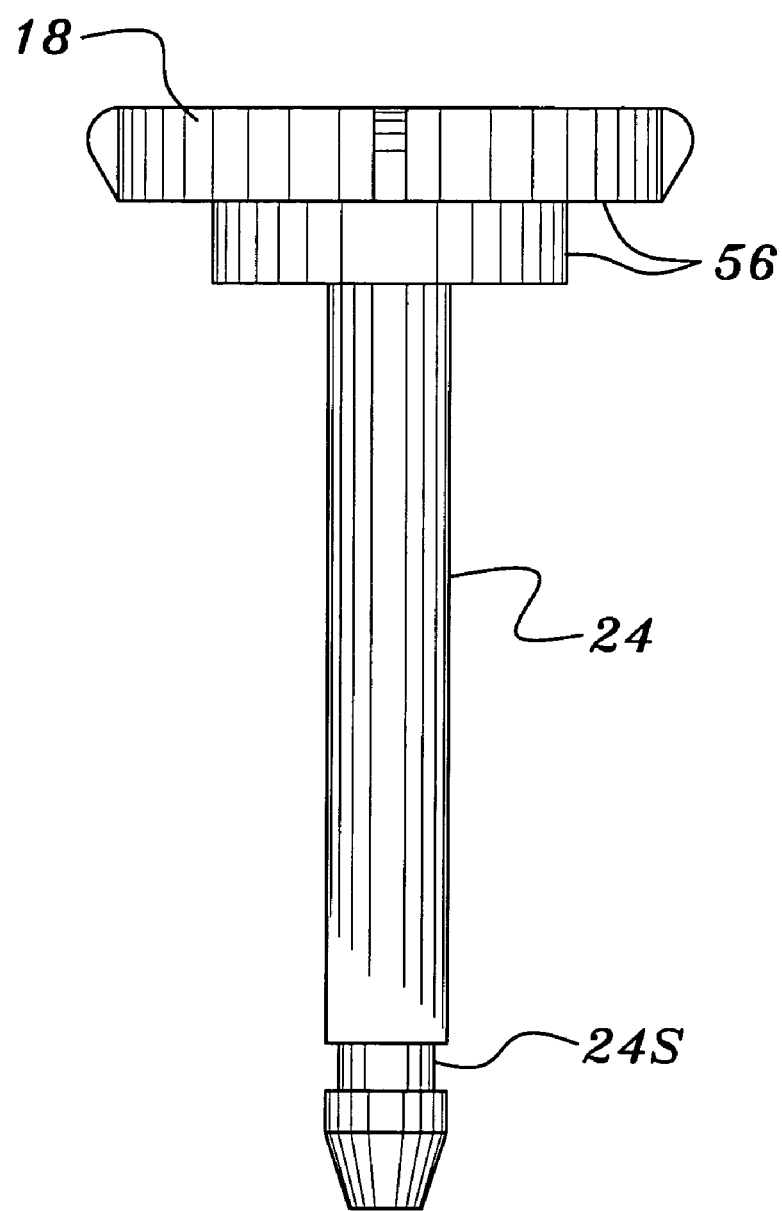
Figure 11C:
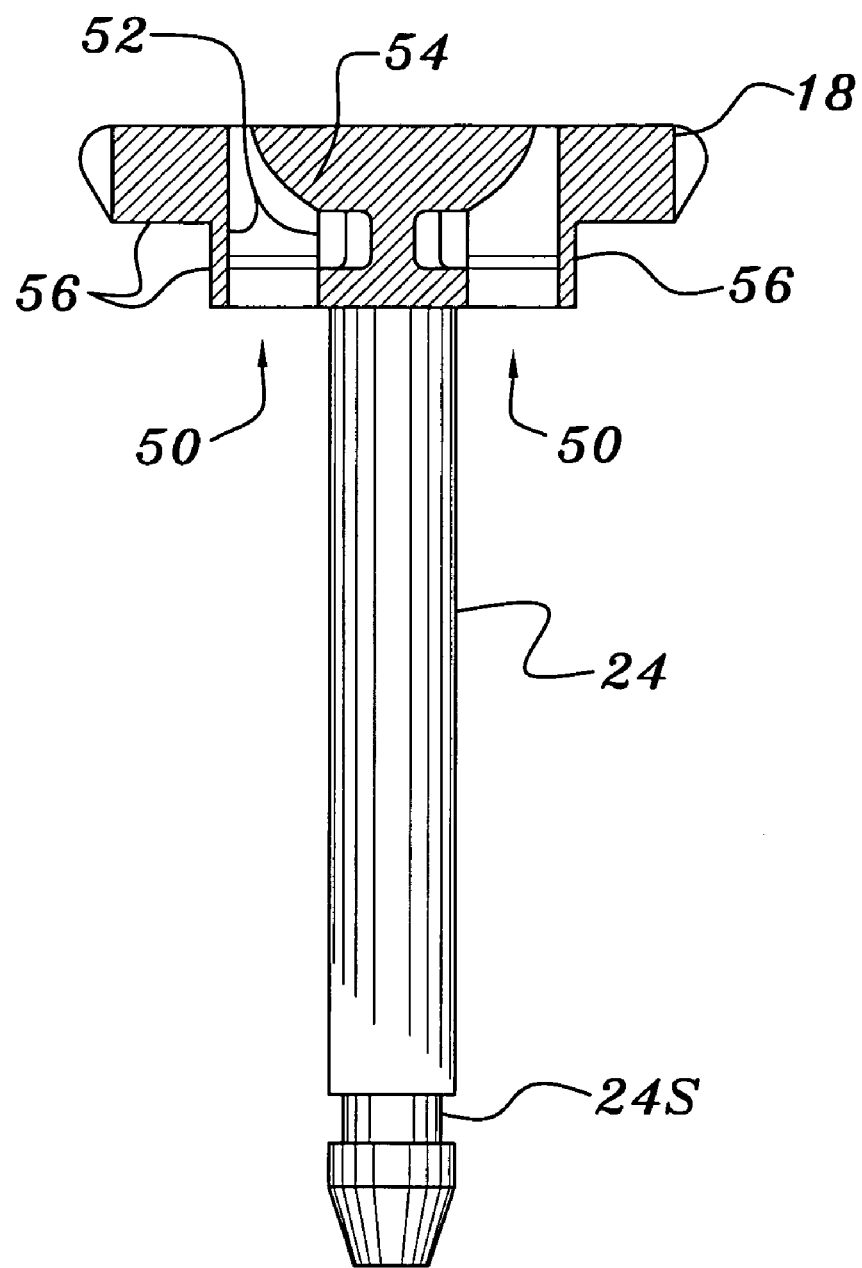
Figure 11D:
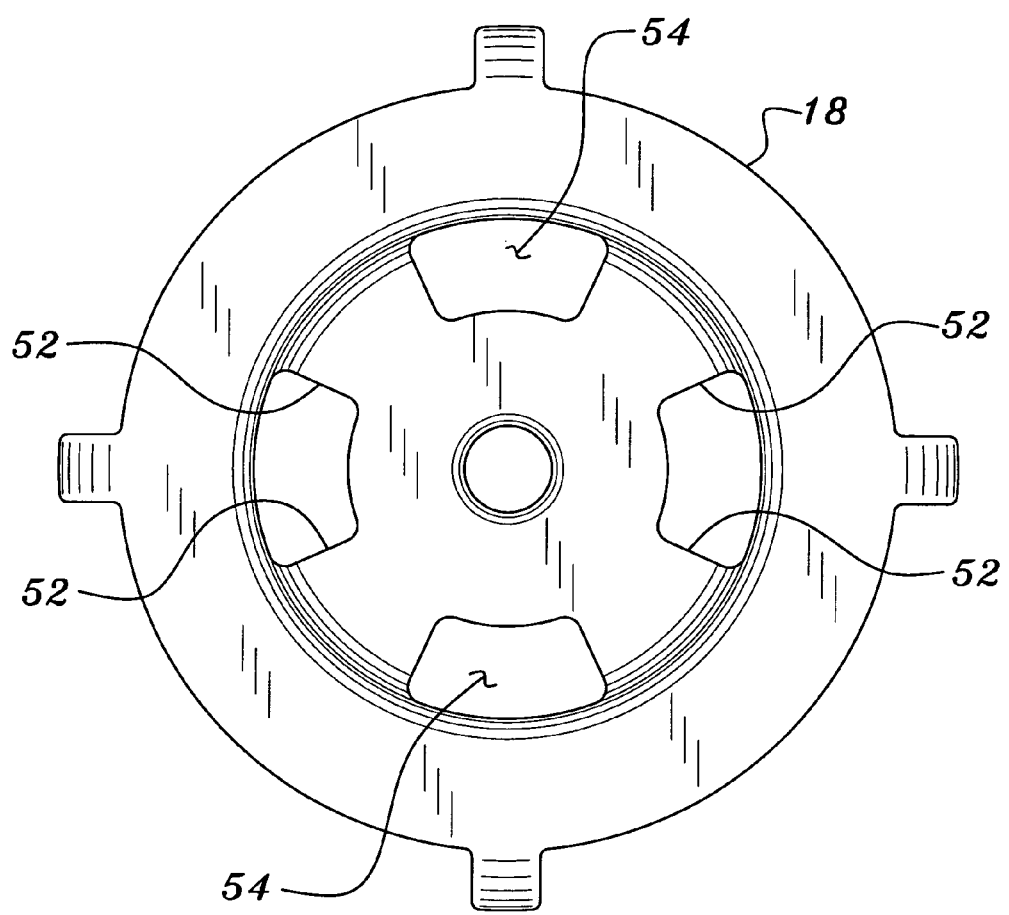
Figure 11E:
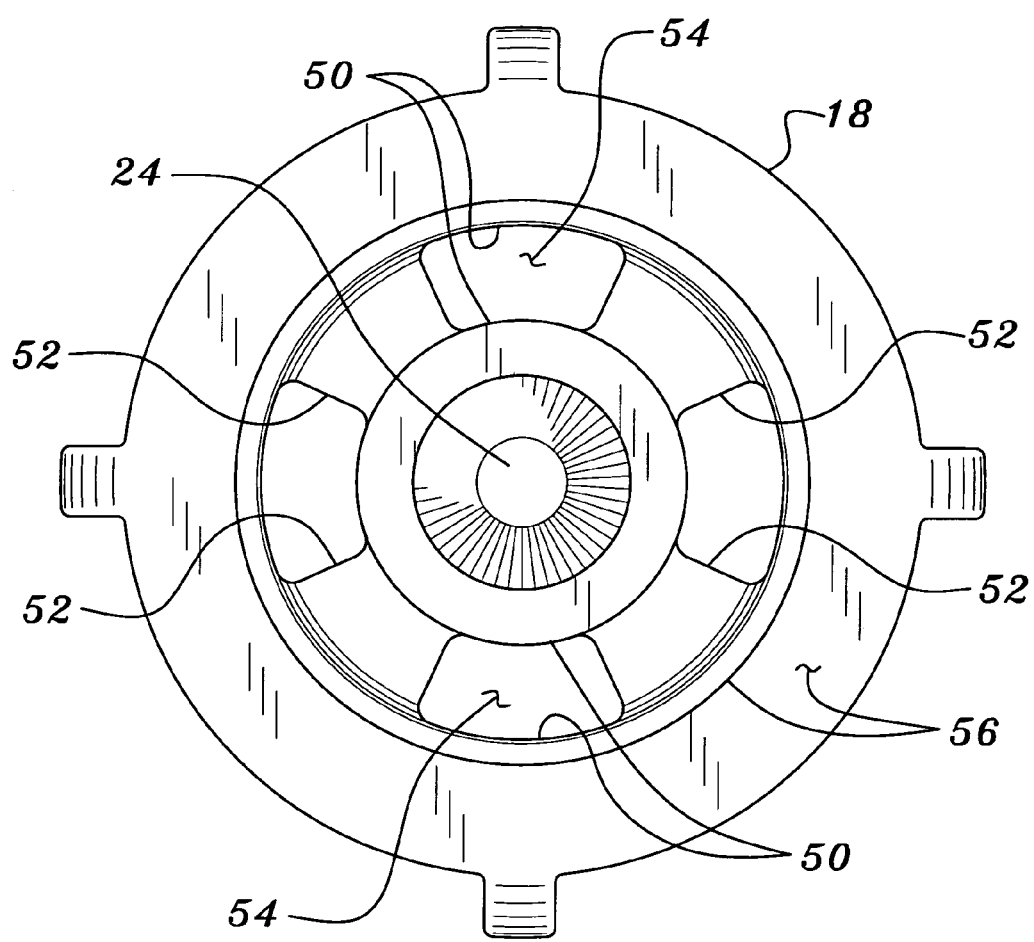
Figure 12A:
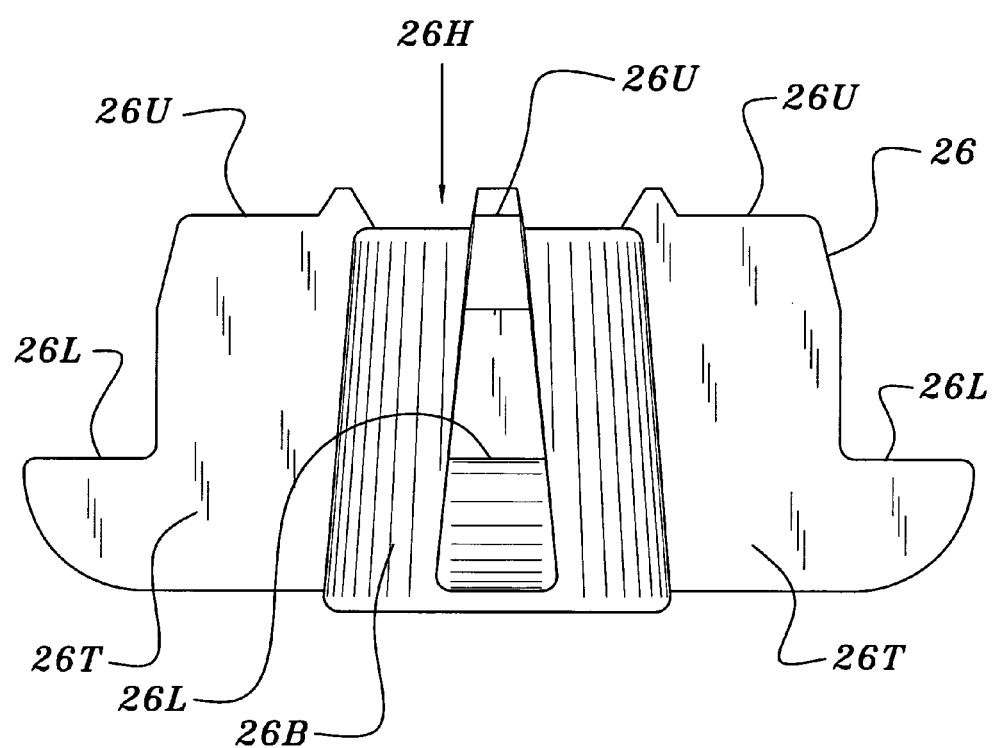
FIGS. 12A–12C are side elevational, perspective and cross-sectional views, respectively, of the poppet of the second embodiment of the invention.
Figure 12B:
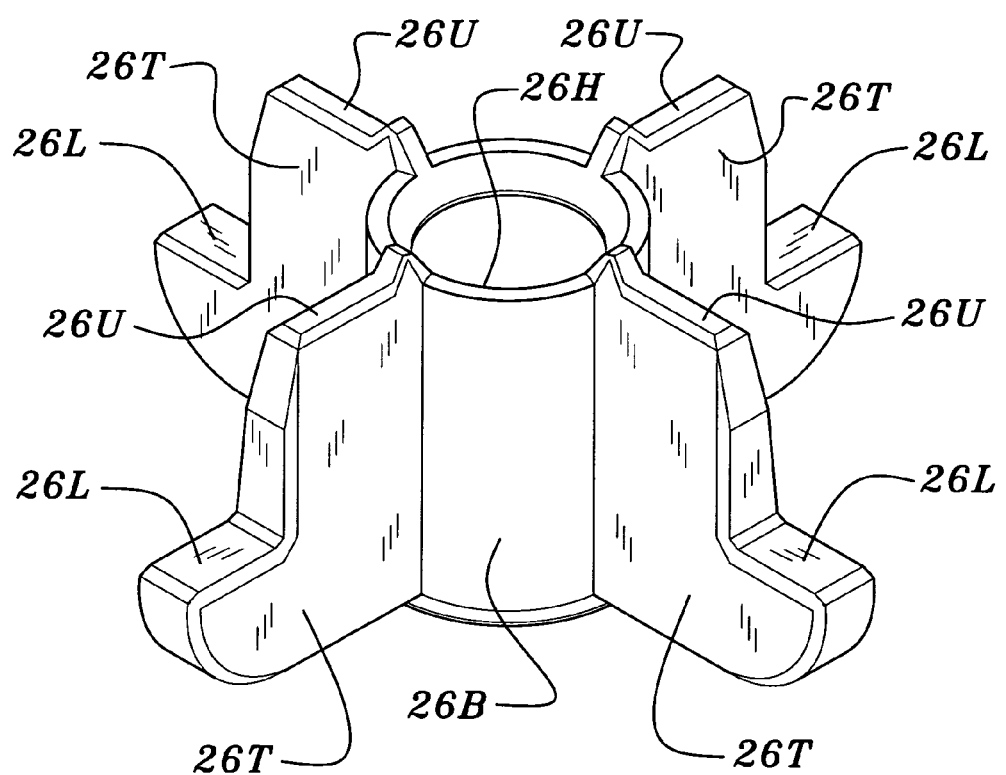
Figure 12C:
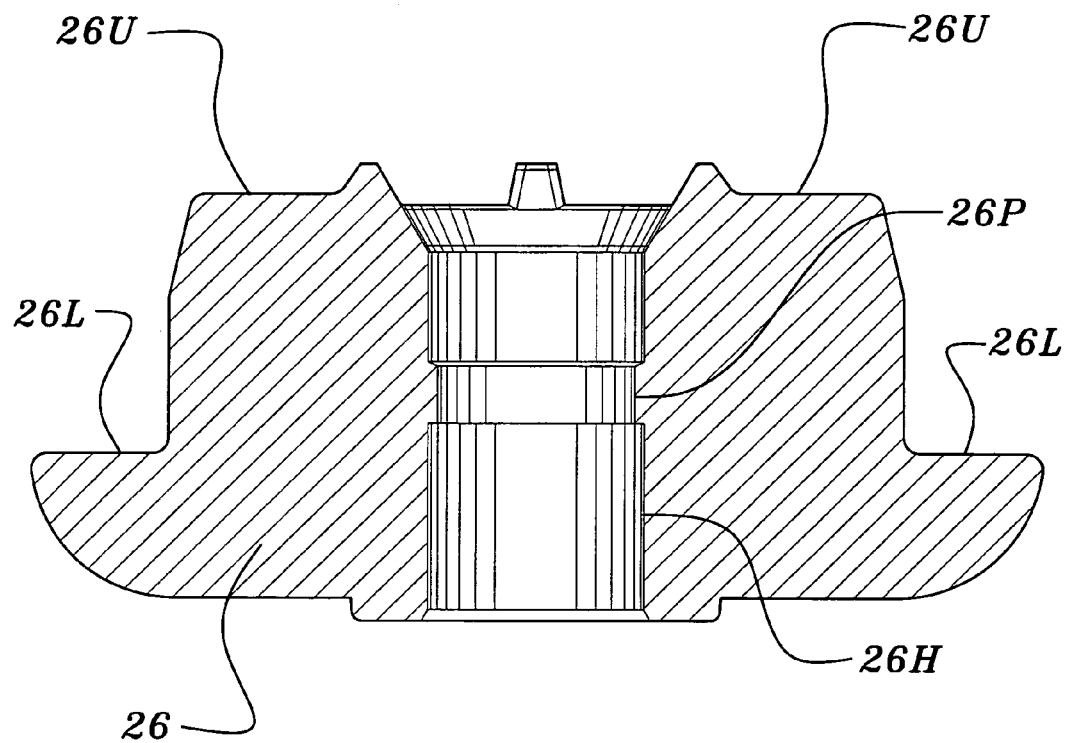

As shown in FIGS. 12A–12C, poppet 26 comprises a base portion 26B having a central hole 26A with an annular protrusion 26P which permanently snap fits into a corresponding annular slot 24S formed at the inflation end of the stem 24 (see FIG. 11B). Body portion 26B further includes four equally spaced radial tabs 26T on which are each formed the lower slot 26L and the upper slot 26U for concentrically entraining the inflation spring 22 and relief spring 38 thereon.

As shown in FIG. 10, the inflation components of the valve 10 comprise the stem head 18 and stem 24, poppet 26, inflation spring 22 and inflation gasket 20. For inflation, external air pressure creates a force against the stem head 18 against the force of the inflation spring 22 to "crack" or open the seal formed between the inflation gasket 20 and the annular seat 14 in the direction of arrow 58. Once the external air pressure is reduced below the cracking pressure, the valve 10 closes in the direction of arrow 59 to reseal the inflation gasket 20 on the annular seat 14.

Figure 13A:
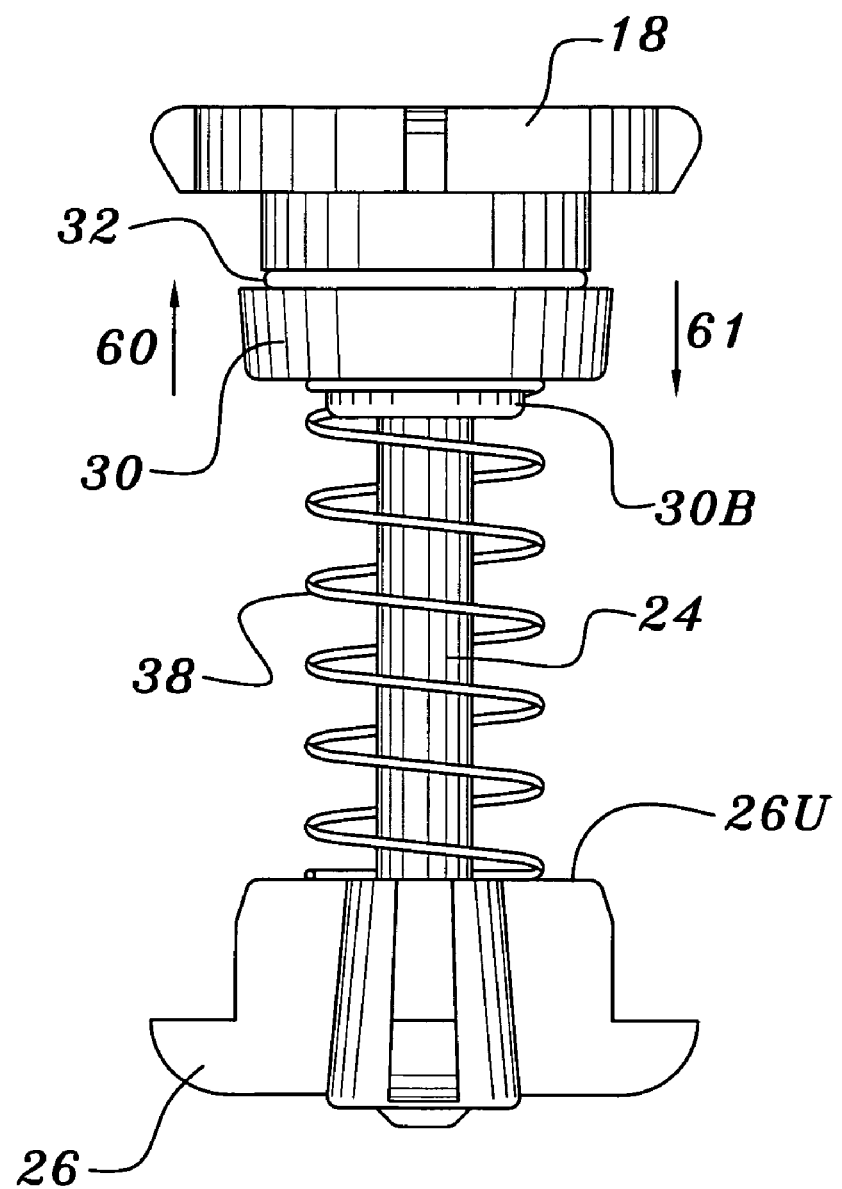
FIG. 13A is a side elevational view of the relief components of the second embodiment of the valve with the valve body removed for clarity.
Figure 13B:
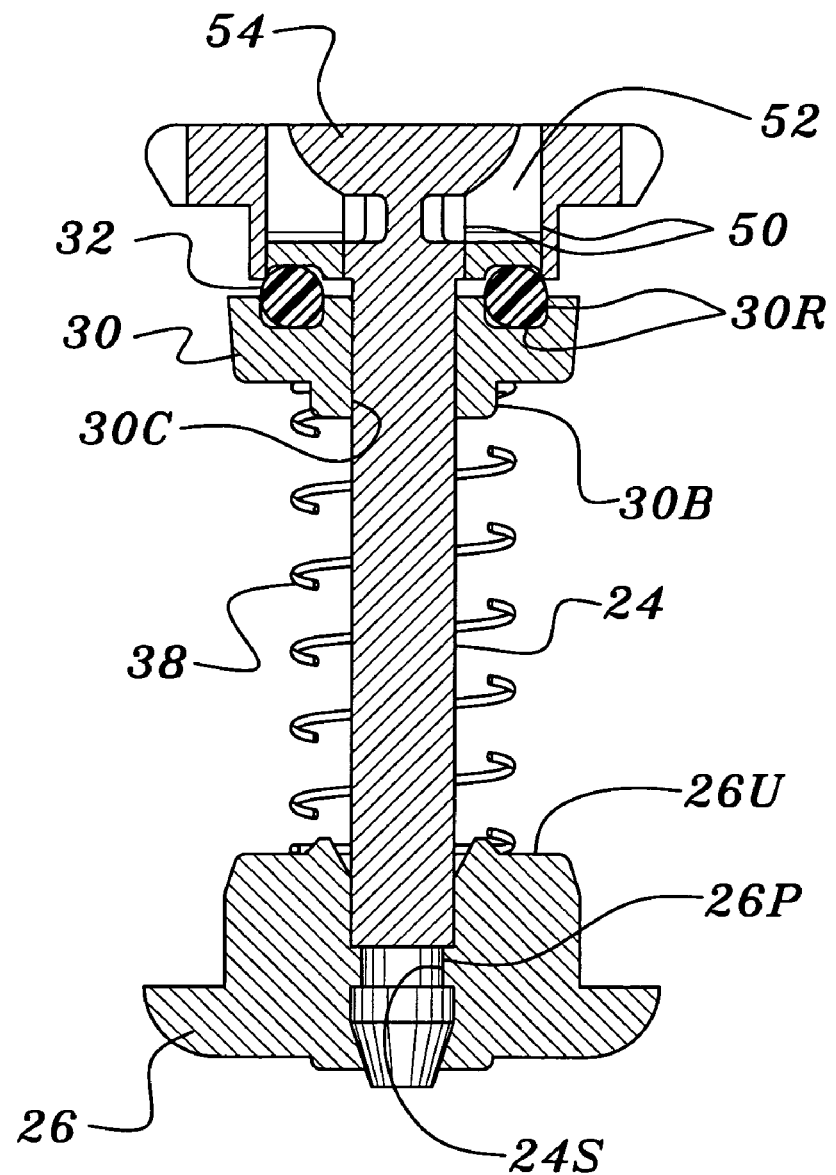
FIG. 13B is a cross-sectional view of FIG. 13a along lines 13b–13b.
Figure 13C:
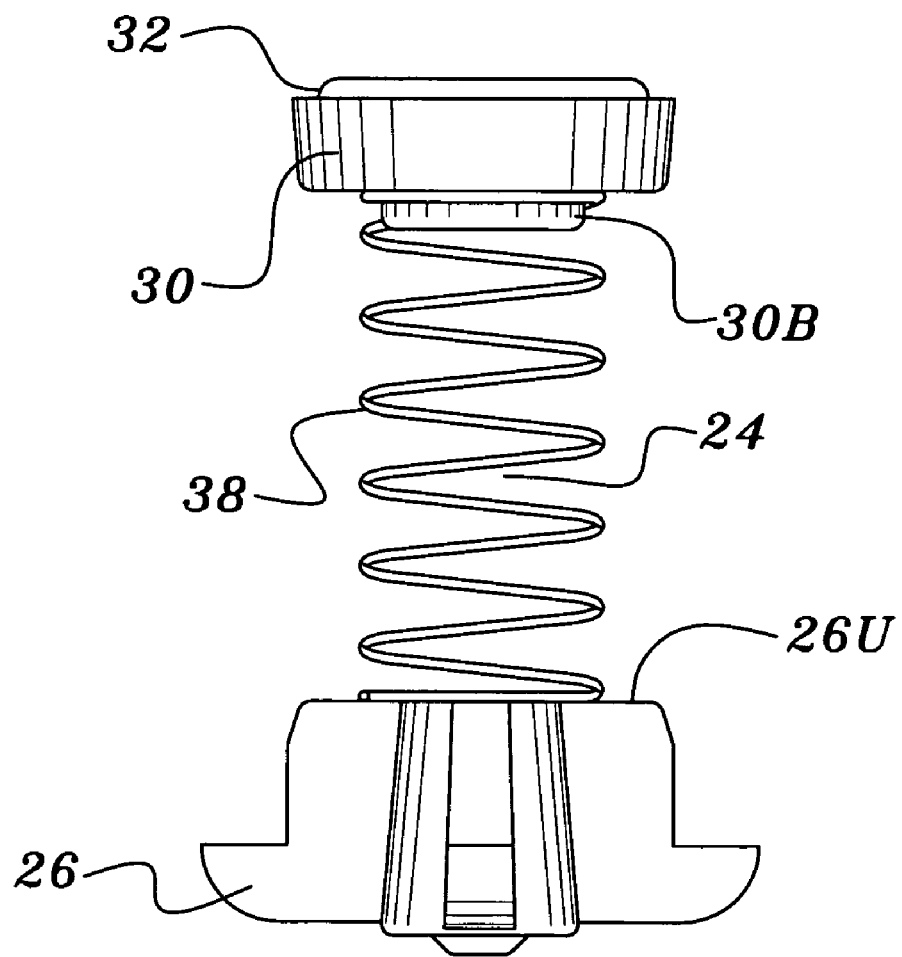
FIG. 13C is a side elevational view of FIG. 13A with the stem head and stem removed showing the O-ring relief gasket positioned within the push disk.
Figure 13D:
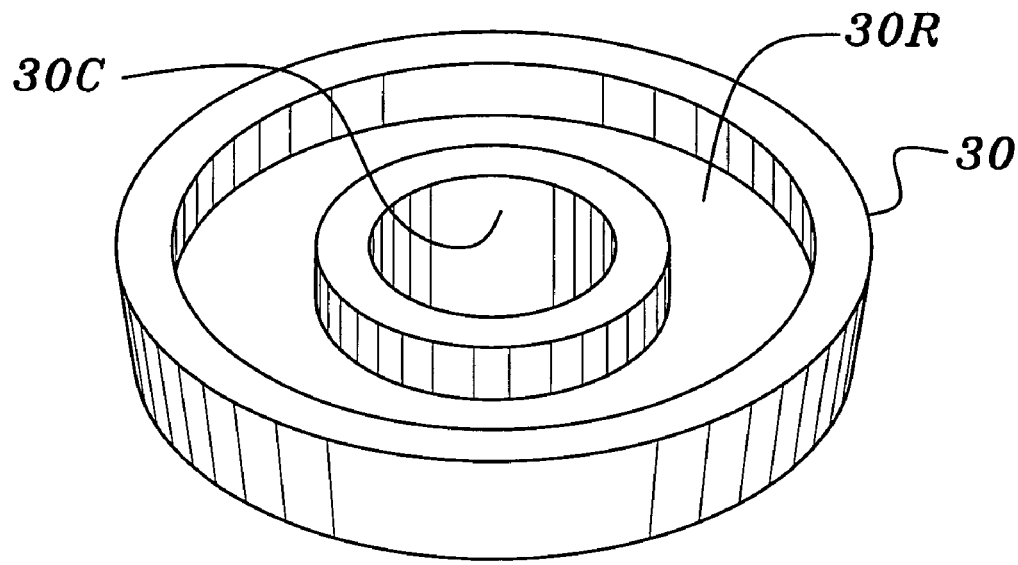
FIG. 13D is a perspective view of the push disk for receiving the O-ring relief gasket.
Figure 13E:
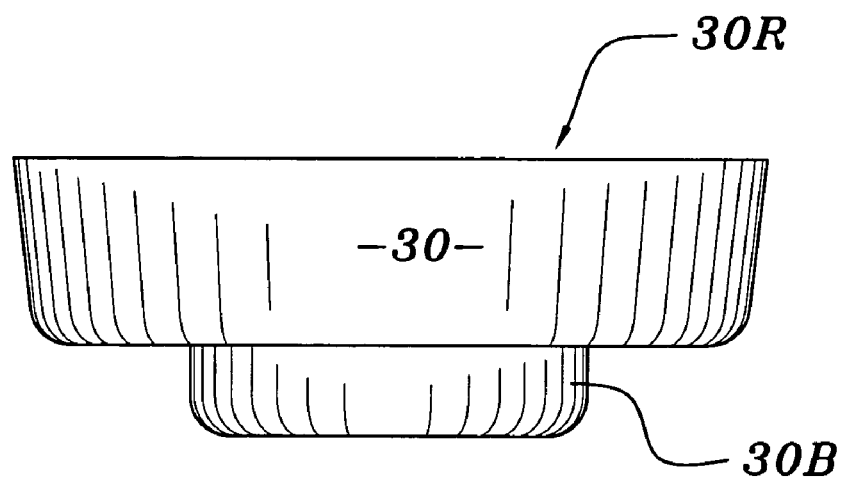
FIG. 13E is a side elevational view of the push disk showing the concentric skirt about which the relief spring is concentrically positioned.

The relief components of the second embodiment of the combination inflation and relief valve 10 of the invention are illustrated in FIGS. 13A–B. More particularly, as shown in FIGS. 13D and 13E, the push disk 30 comprises a generally cylindrical design having a central hole 30C for slidable engagement along stem 24 and having an annular recess 30R for receiving the relief gasket 32 in the form of an O-ring 32. The lowermost surface of the push disk 30 includes a downwardly extending boss 30B for concentrically aligning the relief spring 38 therearound. As shown in FIG. 13C, when the relief spring 38 is entrained between the upper slot 26U of the poppet 26 and the boss 30B of the push disk 30, a constant upward force indicated by arrow 60 is exerted upon the O-ring relief gasket 32 to constantly urge it against the inner annular edges of the annular slot 50 of the stem head 18 causing a double seal therewith (see FIG. 13A).

As shown in FIG. 13A, relief spring 38 constantly urges the O-ring relief gasket 32 into sealing engagement with the annular edges of the annular slot 50 in the direction of arrow 60. As the internal pressure creates a force against the relief gasket 30 via the vents 54 formed by the radial slots 52 and the annular slot 50, the force of the relief spring 38 is eventually exceeded, thereby causing the relief gasket 32 and the push disk 30 to push against the spring 38 to slide along the stem 24 to open or "crack" the relief valve upon unseating the relief gasket 32 from the annular edges of the annular slot 50 in the direction of arrow 61. Once the internal pressure decreases below the cracking pressure, the push disk 30 and gasket 32 move in the direction of arrow 60 along the stem 24 to reseal itself against the annular edges of the annular slot 50 and closing the valve.

It is noted that the stem head 18 may be injected molded solid without the radial slots 52 and the aforementioned relief components (the push disk 30, inflation gasket 32 and the inflation spring 38) omitted entirely to form a simple inflation valve. The ability to mold the stem head 18 solid by a single mold change without insert pins (used to form the radial slots 52) significantly increases the utility of the invention since the same molds and/or components easily convert to produce either the combination inflation and relief valve or a simple inflation valve.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A combination inflation and relief valve, comprising a valve body in which is operatively mounted a reciprocating stem and stem head, said stem head including an inflation gasket resiliently urged in sealing engagement with an inflation valve seat of the valve body by means of an inflation spring positioned concentrically about said stem and entrained between said stem head and a poppet mounted to an end of said stem, said stem head further including at least one relief hole that is sealed by a relief gasket mounted on a push disk, said push disk being reciprocatably coupled to said stem to urge said relief gasket in sealing engagement with said relief hole by a relief spring positioned concentrically about said stem and within said inflation spring and entrained between said push disk and said poppet.

2. A combination inflation valve and relief valve, comprising in combination:
   an inflation valve including a generally cylindrical valve body having an internal annular inflation valve seat and an annular inflation spring seat, a reciprocating stem head positioned within said valve body to which is concentrically mounted an inflation gasket for urging into sealing engagement with the inflation valve seat by an inflation spring concentrically positioned about said stem and entrained between said annular inflation spring seat and a poppet guide securely affixed to the inflation end of said stem; and
   a relief valve including a push disk having a central hole for sliding engagement along the length of said stem, a relief gasket mounted to the relief side of said push disk urged in sealing alignment with at least one relief hole formed through the stem head by a relief spring positioned concentrically about said stem and within said inflation spring and entrained between said push disk and said poppet guide.

3. The combination inflation and relief valve as set forth in claim 2, wherein said stem and said stem head are integrally formed.

4. The combination inflation and relief valve as set forth in claim 2, wherein said inflation gasket comprises an angular surface for sealing engagement with said annular inflation seat.

5. The combination inflation and relief valve as set forth in claim 2, wherein said relief gasket comprises a cupped gasket that seals about said relief hole.

6. The combination inflation and relief valve as set forth in claim 2, wherein said relief gasket comprises an O-ring gasket that seals against opposing annular edges of an annular slot formed in said stem head in fluid communication with said relief hole.

7. The combination inflation and relief valve as set forth in claim 2, wherein said inflation spring and said relief spring are concentrically mounted in alignment about said stem by a lower guide and an upper guide of said poppet, respectively.

8. The combination inflation and relief valve as set forth in claim 2, wherein a lower surface of said stem head comprises a boss for aligning said relief spring concentrically.

9. The combination inflation and relief valve as set forth in claim 8, wherein said poppet comprises radial tabs defining said surfaces.

10. The combination inflation and relief valve as set forth in claim 2, wherein said poppet is permanently affixed to an end of said stem.

11. The combination inflation and relief valve as set forth in claim 2, wherein said stem head is manufactured without said relief hole and wherein said push disk, said relief spring and said relief gasket are omitted during assembly to form a simple inflation valve.

* * * * *